(12) United States Patent
Seekola

(10) Patent No.: US 9,442,926 B2
(45) Date of Patent: Sep. 13, 2016

(54) METER READING

(76) Inventor: Desmond Laurence Seekola, Woodhurst (ZA)

(*) Notice: Subject to any disclaimer, the term of this patent is extended or adjusted under 35 U.S.C. 154(b) by 0 days.

(21) Appl. No.: 14/124,249

(22) PCT Filed: Jun. 6, 2012

(86) PCT No.: PCT/IB2012/052844
§ 371 (c)(1),
(2), (4) Date: Dec. 5, 2013

(87) PCT Pub. No.: WO2012/168873
PCT Pub. Date: Dec. 13, 2012

(65) Prior Publication Data
US 2014/0110472 A1 Apr. 24, 2014

(30) Foreign Application Priority Data
Jun. 6, 2011 (ZA) .................................. 2011/04168

(51) Int. Cl.
*G06K 19/00* (2006.01)
*G06F 17/30* (2006.01)
*G01D 4/00* (2006.01)

(52) U.S. Cl.
CPC ............... *G06F 17/30* (2013.01); *G01D 4/002* (2013.01); *Y02B 90/241* (2013.01); *Y04S 20/32* (2013.01)

(58) Field of Classification Search
USPC .......................... 235/375, 435, 439, 451, 462
See application file for complete search history.

(56) References Cited

U.S. PATENT DOCUMENTS

| | | | |
|---|---|---|---|
| 5,171,976 A * | 12/1992 | Bone, Jr. ...................... 235/375 |
| 6,853,309 B1 * | 2/2005 | Schroter ................... 340/870.02 |
| 7,349,588 B2 | 3/2008 | Butterworth .................. 382/321 |
| 2002/0109608 A1 | 8/2002 | Petite et al. ............. 340/870.02 |

OTHER PUBLICATIONS

International Search Report and Written Opinion for related PCT Application No. PCT/IB2012/052844 mailed on Jan. 17, 2013.
International Preliminary Report on Patentability for related PCT Application No. PCT/IB2012/052844 issued on Dec. 10, 2013.

* cited by examiner

*Primary Examiner* — Matthew Mikels
(74) *Attorney, Agent, or Firm* — Ladas & Parry, LLP

(57) ABSTRACT

This invention relates to a method and reader system for reading a mechanically variable display, particularly those provided with a meter, as well as to a metering system and a meter for measuring a commodity. In particular, the invention relates to a method and reader system for electronically reading a variable display comprising one or more mechanically variable display elements variably displaying one or more machine readable code/s which involves receiving reading data from an optical reader device, the reading data comprising at least an electrical signal, or information associated therewith, associated with at least one machine readable code read by the optical reader device; and processing the received reading data to determine a reading or character string associated displayed by, or associated with, the variable display.

18 Claims, 7 Drawing Sheets

METER READING

CROSS-REFERENCE TO RELATED APPLICATIONS

This application is the U.S. National Stage of International Patent Application No. PCT/IB2012/052844 filed on Jun. 6, 2012, which claims priority to South African Patent Application No. 2011/04168, filed on Jun. 6, 2011 the disclosures of which are hereby incorporated in their entireties by reference.

BACKGROUND OF THE INVENTION

THIS invention relates to a method and reader system for reading a mechanically variable display, particularly those provided with a meter, as well as to a metering system and a meter.

Conventional mechanical, or in certain instances electromechanical, meters, for example, odometers or trip meters in vehicles, and commodity meters for the measurement of commodities such as water or electricity, often have mechanically variable displays which require human operators to physically inspect them in order to obtain readings or measurements therefrom. These mechanical displays typically comprise a plurality of interconnected rotatable indicator wheels displaying numeric or alphanumeric data corresponding to the accumulated use of the commodity in question. For commodities in particular, inspection of these meters to obtain readings or measurements may be undesirably time-consuming and any billing done on these readings or measurements could be unreliable. Automated metering systems have been devised but are usually expensive and complicated, as well as being of somewhat limited use.

An example of an automated system is described in U.S. Pat. No. 7,349,588. However, this involves camera technology and OCR using pattern recognition techniques. The main disadvantage of this system is the complexity of the hardware and software associated with pattern recognition resulting in poor accuracy due, for example, when the numbers of a meter are in transition and therefore hidden or obscured from the camera vision. It is an object of the invention to address the disadvantages and problems associated with the prior art.

SUMMARY OF THE INVENTION

According to a first aspect of the invention, there is provided a method for electronically reading a variable display comprising one or more mechanically variable display elements variably displaying one or more machine readable code/s, the method comprising:
receiving reading data from an optical reader device, the reading data comprising at least an electrical signal, or information associated therewith, associated with at least one machine readable code read by the optical reader device; and
processing the received reading data to determine a reading or character string associated displayed by, or associated with, the variable display.

The method may comprise:
receiving reading data associated with machine readable codes displayed by all or a majority of display elements of the variable display;
processing the received reading data to determine characters associated with the machine readable codes displayed by all or the majority of display elements.

The method may further comprise:
determining from the reading data received, each character/s associated with the machine readable code displayed by each display element; and
determining a reading or character string associated with the machine readable codes displayed by the display elements by concatenating the determined characters in an order corresponding to positions of the corresponding variable display elements on the variable display.

The method may comprise outputting the determined reading or character string by one or more of transmitting the same to a remote location and operating an electronic display means to display the same electronically.

The method may comprise decoding the reading data in accordance with a decoding scheme or algorithm in order to determine the character/s associated with the reading data.

The variable display may be associated with a meter such that the display elements comprises display wheels which rotatably display the machine readable codes corresponding to numeric or alphanumeric values or characters.

The method may comprise:
providing a machine readable code at each display zone on a display surface of each indicator wheel, wherein the machine readable code is selected from one or more of a bar code, a machine readable colour coding, a Quick Response (QR) code, a geometric shape code, a dark or black display zone, a light or white display zone and a pattern thickness code readable by a machine; and
optionally providing a corresponding character indicia or numeral on each display zone, adjacent the machine readable code.

The method may comprise providing a checking machine readable code on at least a portion of at least one display zone of one or more display wheels, wherein the checking machine readable code may be selected from one or more of a bar code, a machine readable colour coding, a Quick Response (QR) code, a geometric shape code, a dark or black display zone, a light or white display zone and a pattern, shape or line thickness code readable by a machine.

The method may comprise:
receiving checking data from the optical reader device, the checking data comprising at least an electrical signal, or information associated therewith, associated with at least one checking machine readable code read by the optical reader device; and
processing the received checking data to:
determine if a lesser significant display wheel is in transition to display a subsequent display zone;
if it is determined that the lesser significant display wheel is in transition to display a subsequent display zone, determining if the transition will result in a transition of an adjacent more significant wheel;
if it is determined that the transition will result in the transition of the adjacent more significant wheel, incrementing the numeric value determined from the machine readable code displayed by the more significant wheel or assigning the next numeric value to be displayed by the more significant wheel thereto; and
repeating the processing steps for all, where applicable, the display wheels of the variable display.

It will be understood that the processing steps may only be repeated for the wheels where applicable, i.e., when there are wheels in transition. For the most significant wheel, the processing will only run until it is determined whether or not the most significant wheel is in transition and processing accordingly as there is no more significant wheel than the most significant wheel.

If it is determined that the lesser significant display wheel is in transition to display a subsequent display zone, the method may comprise incrementing the numeric value determined from the machine readable code displayed by the lesser significant wheel or assigning the next numeric value to be displayed by the lesser significant wheel thereto.

The method may comprise:
determining an initial numeric value reading of the meter;
implementing a counter to obtain a counter value;
receiving reading data associated with the machine readable code provided on at least one display zone of the last or least significant display wheel, at each rotation of the display wheel;
incrementing the counter, and hence the counter value, for each instance of the reading data being obtained from the at the display zone; and
determining a current reading of the meter by determining a current counter value.

According to a second aspect of the invention there is provided a reader system for electronically reading a variable display comprising one or more mechanically variable display elements variably displaying one or more machine readable code/s, the reader system comprising:
an optical reader device configured to read a machine readable code displayed by at least one display element; and
   a processor communicably coupled to the optical reader device, the processor comprising:
a receiver module configured to receive, from the optical reader device, reading data comprising at least electrical signals, or information associated therewith, associated with the machine readable code/s read by the optical reader device; and
a reading determining module configured to process the received reading data to determine a reading or character string displayed by, or associated with, the machine readable codes displayed by the variable display.

The optical reader may be configured to read machine readable codes displayed by all or a majority of display elements, and wherein the reading determining module is configured to determine a reading or character string displayed by, or associated with, machine readable codes displayed by, or associated with, all or a majority of display elements of the variable display.

The reading determining module may be configured to:
determine, from the reading data received, each character/s associated with the machine readable code displayed by each display element; and
determine a reading or character string associated with the machine readable codes displayed by the majority of the display elements of the variable display by concatenating the determined characters in an order corresponding to positions of the corresponding variable display elements on the variable display.

The reader system may comprise an automatically or manually actuable output means comprising one or more of a communication module configured to transmit the determined reading or character string to a remote location, electronic display means configured to display the determining reading or character string same electronically and audio output means to audibly output the determining reading or character string. The variable display may be associated with a meter such that the display elements comprises display wheels which rotatably display the machine readable codes corresponding to numeric or alphanumeric values or characters.

The reader system, or at least components thereof, may be provided in a housing which is configured to be handheld or housed in a housing which comprises attachment means for operative attachment to the meter such that the optical reader device is positioned substantially transverse to the variable display of the meter.

In an example embodiment, the processor may further comprise:
a checking receiver module configured to receive checking data from the optical reader device, the checking data comprising at least an electrical signal, or information associated therewith, associated with at least one checking machine readable code read by the optical reader device from a display zone displayed by at least one display wheel; and
   a transition determining module configured to perform the following processing steps:
determining if a lesser significant display wheel is in transition to display a subsequent display zone;
if it is determined that the lesser significant display wheel is in transition to display a subsequent display zone, determining if the transition will result in a transition of an adjacent more significant wheel;
if it is determined that the transition will result in the transition of the adjacent more significant wheel, operating the reading determining module to increment the numeric value determined from the machine readable code displayed by the more significant wheel or assign the next numeric value to be displayed by the more significant wheel thereto; and
repeating the processing steps for all the display wheels of the variable display.

It will be appreciated that the reader system may be operable in one or more of a continuous mode or a manual mode, wherein in the continuous mode the reader system may be configured continuously to operate to determine the reading, or character string, and optionally to operate the output means automatically, and wherein in the manual mode the reader system may be configured to operate when prompted to determine the reading, or character string.

According to a third aspect of the invention, there is provided a system for reading a meter, the system comprising:
a meter having a variable display comprising display wheels which rotatably display machine readable codes corresponding to numeric or alphanumeric values or characters; and
an optical reader device positioned relative the variable display to read the machine readable codes.

According to a fourth aspect of the invention, there is provided a metering system for a commodity comprising:
a remote receiver module configured to receive, periodically or on an ad hoc basis, determined readings or character strings from a plurality of reader systems as described above disposed relative to meters for measuring usage of a commodity;
a database configured to store at least the received readings or character one strings; and
an associating module configured to associate, in the database, received readings or character strings with the respective meters.

The system may comprise a billing module configured to use the reading data associated with a particular meter or associated reader system in accordance with at least one tariff structure thereby to determine a cost for usage of the metered commodity.

According to a fifth aspect of the invention, there is provided a meter for measuring a commodity, the meter comprising a variable display operatively connected to suitable measuring components, the variable display comprising one or more mechanically variable display elements provided with display zones displaying machine readable codes corresponding to numeric values or characters.

It will be appreciated that the mechanically variable display elements may comprise planar surfaces thereby to facilitate reading thereof by an optical reader device. The mechanically variable display elements may comprise display wheels which rotatably display the machine readable codes.

The machine readable code may be selected from one or more of a bar code, a machine readable colour coding, a Quick Response (QR) code, a geometric shape code, a dark or black display zone, a light or white display zone and a pattern thickness code readable by a machine.

According to another aspect of the invention a method for reading a meter or other display of characters includes image capturing means for the display, and means for analysing the encoded data.

Means may be provided for transmitting the coded data to a receiving station, means to decode the data, and means to process and/or record and/or otherwise utilise the decoded data. The decoded data may be converted into ASCII data via electronic means.

The preferred form of the invention envisages the use of encoding means in the form of machine-readable code, for example bar-coding.

This may be adapted to read and recognise partially obscured characters—for example, adjacent numbers in the course of transition in a water or electricity meter.

The encoded data may be scanned in one-dimensional light scanning technique such as used in the barcode scanning technique.

BRIEF DESCRIPTION OF THE INVENTION

DESCRIPTION OF PREFERRED EXAMPLE EMBODIMENTS

In the following description, for purposes of explanation, numerous specific details are set forth in order to provide a thorough understanding of an embodiment of the present disclosure. It will be evident, however, to one skilled in the art that the present disclosure may be practiced without these specific details.

Figure 1:
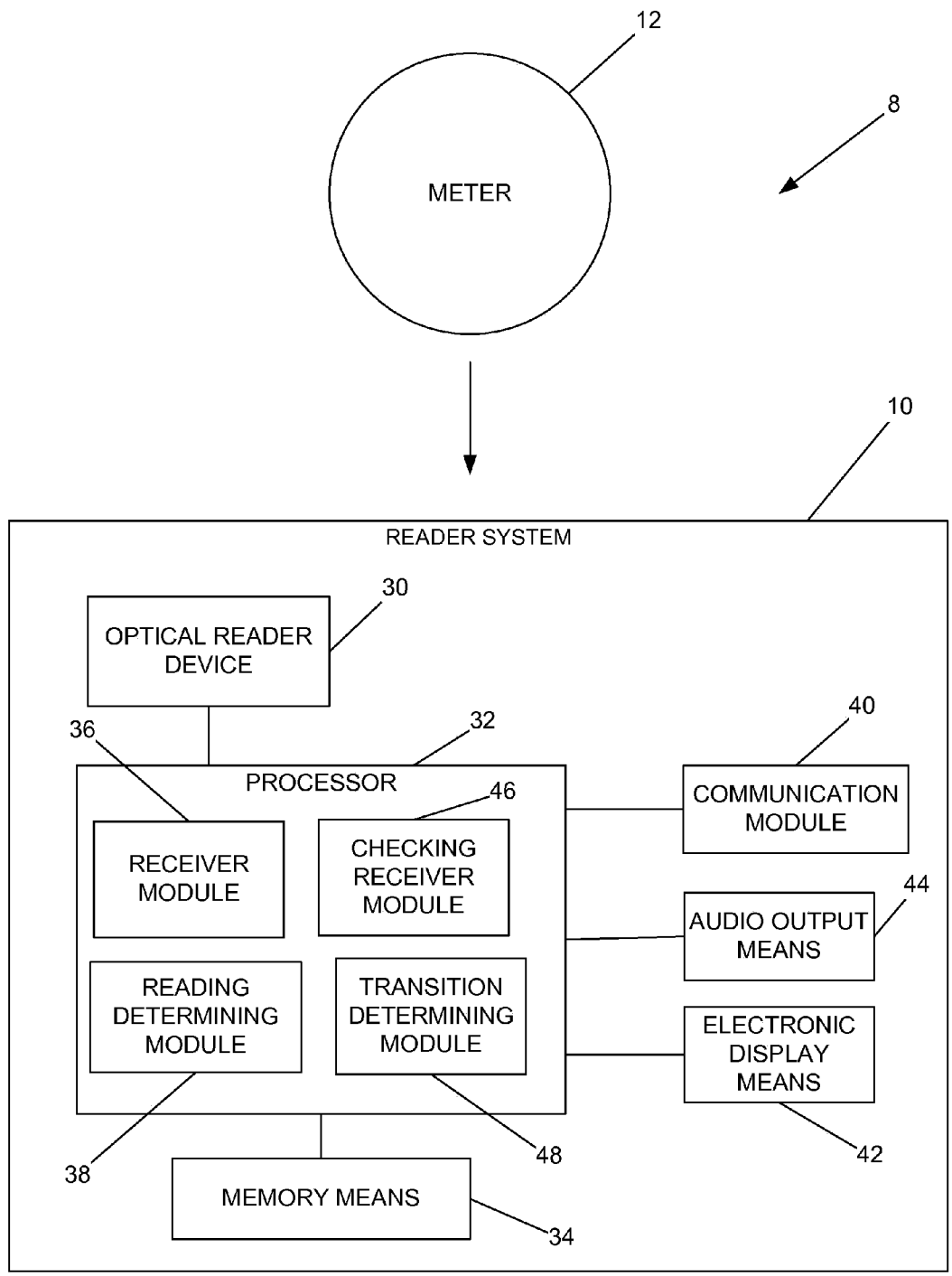
FIG. 1 shows a schematic block diagram of a system for reading a meter in accordance with an example embodiment of the invention.

Referring to FIGS. 1 to 5 of the drawings, a system for reading a meter in accordance with an example embodiment and is generally indicated by reference numeral 8 (FIG. 1). The system 8 comprises a reader system 10 and a meter 12, whereby the reader system 10 is configured to read the meter 12. The meter 12 (FIG. 2) comprises a mechanically actuated variable display 14 comprising a plurality of mechanically variable display elements 16 variably displaying data. The meter 12 is typically a commodities meter such as a water or electricity meter. Though the invention may be applicable to other meters or devices comprising mechanically variable displays, reference will be made to the variable display 14 being associated with a water meter 12.

Figure 3:
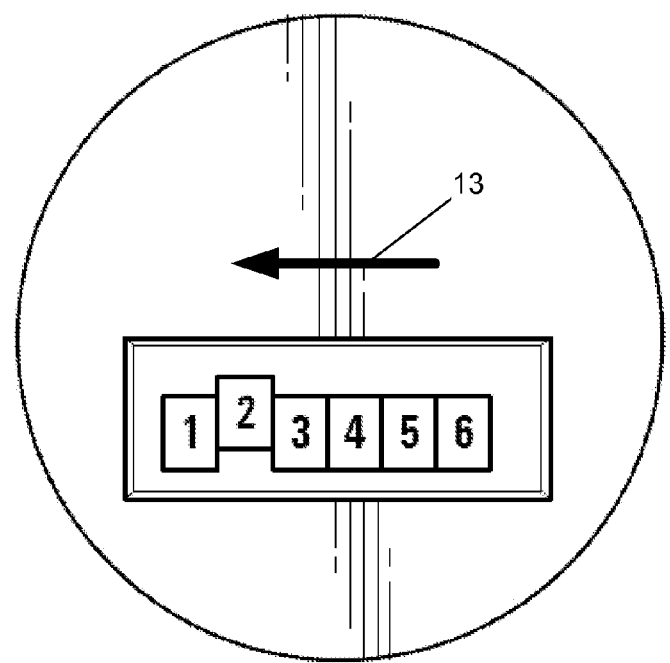
FIG. 3 shows an example illustration of a face of a conventional meter.
Figure 4:
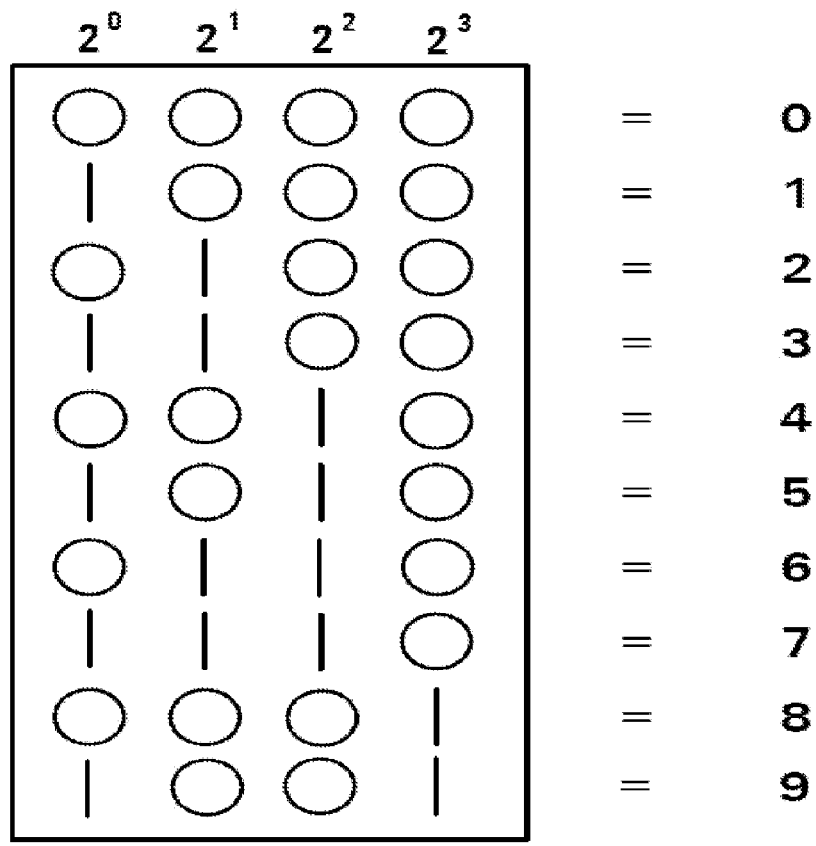
FIG. 4 shows an example illustration of machine code mapping in accordance with an example embodiment of the invention.

It will be noted that conventional meters, of the type illustrated in FIG. 3, typically comprise mechanically variable elements having display wheels configured rotatably to display numeric characters or digits, ranging from "0" to "9", on display zones on display surfaces of the wheels. The display wheels are positioned such that they shoulder each other with more significant wheels to the left of lesser significant wheels, in front view. The last wheel on the right of the variable display is typically the least significant wheel in the display. In other words, the wheels are provided from least significant to most significant in the direction of arrow 13. The wheels are operatively connected to an associated measurement system and gearing mechanism such that they rotate to display a measured accumulated consumption of water typically associated with a household, apartment block, factory, or the like.

The problem with conventional meters, as mentioned above, is that the measured accumulated consumption is displayed in a manual manner and human operators are often required to physically inspect meters to obtain readings or measurements therefrom, e.g., for billing purposes. This method in some instances results in unreliable readings. Some municipalities read meters infrequently, for example every quarter, because of capacity issues and estimate subsequent monthly readings based on average usage. In this case a first error is further compounded. Systems to obtain readings or measurements electronically are often expensive and complicated. Modern meters having electronic displays and measuring systems are often expensive and it is usually too costly and onerous to replace conventional water meters having mechanical variable displays with electronic ones. In this regard, the present invention seeks to address these problems and to address the reading of meters in a different manner.

Figure 2:
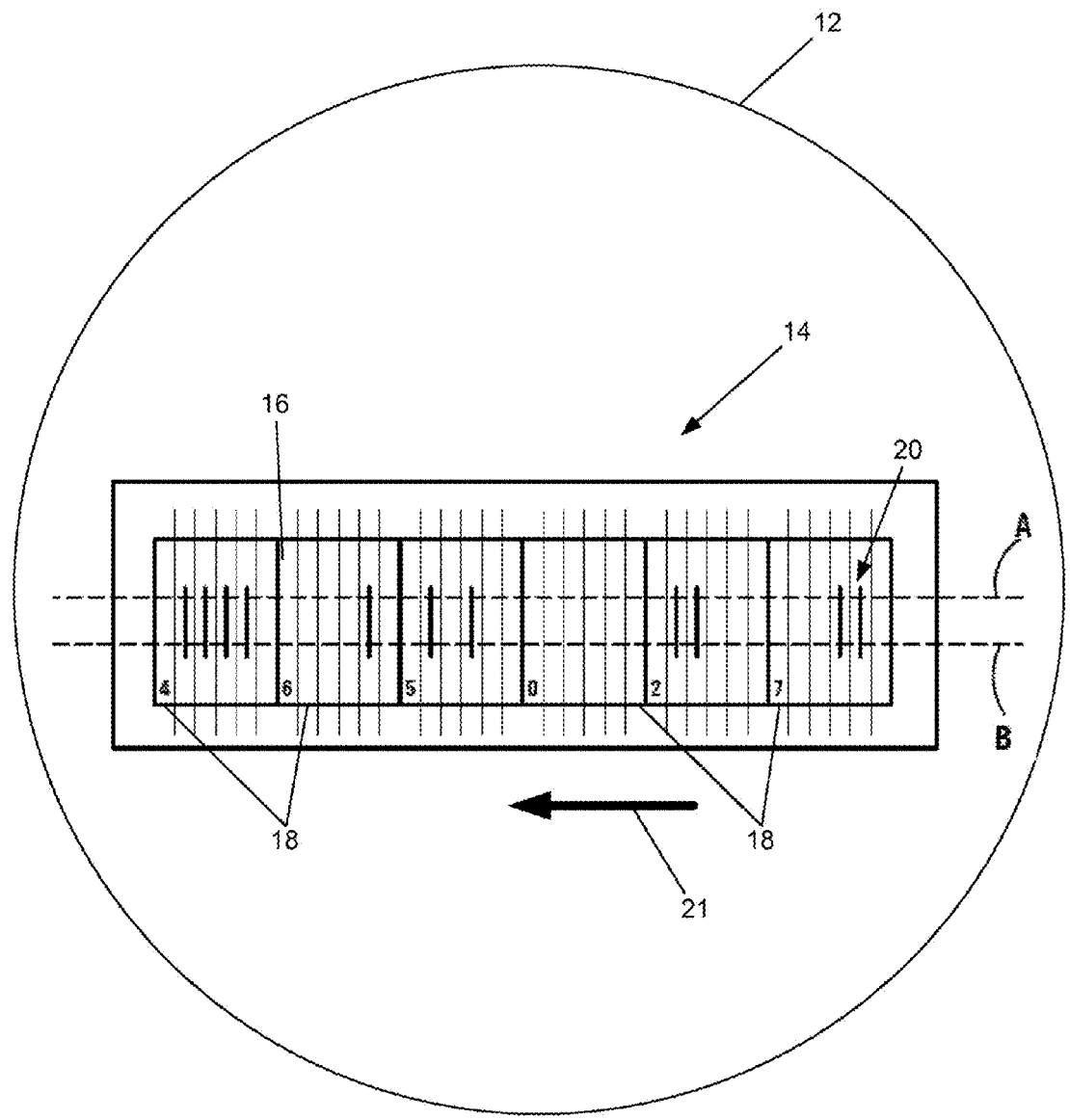
FIG. 2 shows an example illustration of a face of the meter in accordance with an example embodiment of the invention.

The meter 12 is similar to a conventional water meter as described above. However, the meter 12 differs significantly in that associated display zones 16 on each display wheel 18 is provided with a machine readable code (MRC) 20 corresponding to the respective digit or numeric character usually provided on the a conventional wheel 18. In certain example embodiments the MRCs 20 are centrally located on the display zones 16, with the corresponding digits provided to a corner of the display zone as illustrated in FIG. 2 in order to still permit human inspection, if desired. The MRCs 20 are, for example, non-alphanumeric or non-human readable/comprehensible and are readable by a machine as will be described below. To this end, the MRC 20 may be encoded in or may be selected from one or more of a bar code, a machine readable colour coding, a Quick Response (QR)

code, a geometric shape code, a dark or black display zone, a light or white display zone and a pattern thickness code readable by a machine.

Several type of codes can be used can be used on segment displays. These can be simple lines as will be described further in the preferred embodiment or more exotic such as lines that vary in spatial frequency. For example, once can uses three lines where the interline spacing varies with increases value of a digit value. The digit one having a smaller interline spacing than "2" and "2" less than "3", etc.

2D patterns may also be used, for example, a 3 row×3 column matrix of dots, where the location of a dot at specific (row, column) of the matrix represents a human readable digit. For example a dot at spatial position (1, 1) with blank space at all other points in matrix represents a "1". Similarly a dot at spatial position (1, 3) represents "9". Depending on the mode of operation or information on the segment it may be advantageous to use a 2 D optical photosensor array or to read a particular segment more than once to read different spatial parts of the same segment.

Codes can also be used to uniquely identify any particular segment. A particular "ID" code different from the central main code denoting commodity or the CMRC code can be placed at the beginning, left portion of a segment to reveal to the optical reader its identity in terms of its linear position in the counter. For example in a rotatable system the second wheel form the LSW will have a bar code denoting the number 2. Since the segment in its central main code reveals its value, one has uniquely identified the display segment in the counter. This is advantageous for the following reasons. For operation the linear optical array elements should be reasonably well aligned or mapped to the display elements for decoding. When decoding the identifier code can be used to reveal of there is misalignment of optical sensor with display segment. This function is also useful for alignment purposes in device construction. It can also be used to indicate malfunction, especially if the main code on the segment is damaged. Similarly codes can be put at right end of a segment to denote, end of a segment.

In any event, by way of an example, the MRC 20 is typically a bar code comprising four slots on the display zone 16 where elongate bars and empty white space may be used in combination to provide the MRC 20. The bars may be equidistant and of equal length.

The four bars or white space may be located at slot or position 1, position 2, position 3 and position 4. Indicating any number or digit is dependant on the presence or absence of a bar at any one of the four positions. This may be illustrated in the example mapping of FIG. 4 where "0" corresponds to white space and the combination of bars and white spaces corresponds or maps to a numeral or digit. For example, the number 1 is indicated by one bar located at the first position or $2^1=1$, the number 5 is one bar at position 1 and one bar at position 3 that is $2^1+2^2=5$. Empty space with no bars indicates the number "0".

As mentioned, for a typical meter display each human readable digit is replaced with 4 bars. For example for 4 digits there will be 16 bars, each set of 4 bars being separated by a large space or mechanical aperture.

Alternatively, instead of using 4 bars, a single bar is used in which the reflected bar intensity is linearly proportional to digit value. For example, 9 has a higher reflected intensity than 1. One has a higher amount of printed bar ink so the layer thickness of the printed ink determines light intensity. An alternative could be to use a single bar with constant thickness for all digits, with the width of each bar being proportional to the digit value. As the 1 D bar scanner scans (described below) width it converts the length to its equivalent digital value. For example, 9 yields a higher voltage than 1 which is processed through microcontroller and converts it to a human code readable value.

It will be appreciated that each display zone 16 may also comprise checking machine readable codes (CMRCs 17, FIG. 5) in order to provide digit or wheel 18 rotary position (transitional digits). The last digit (least significant) may contain CMRCs 17 comprising additional bars to indicate the rotary position of the face. One of the problems with the last digit is that it could be in a partially rotated state depending on the commodity usage. This leads to inaccuracies especially when using a conventional OCR system. In this invention additional bars are added on the right of the conventional 4 bars, a first additional bar to the top third of the digit face plus 2 additional bars to the middle portion of the face and 3 additional bars to the bottom third of the face. Each set of additional bars indicates the rotary position of the face. Other similar methods could be used where the additional bars could be a single right angle triangle or a staggered triangle to the right of the 4 bars, where the horizontal width (parallel to triangle base) of each segment of the triangle determines the rotary position of the face, that is the top third of a rotation with a smaller width than the middle third, and its face rotates with the width as seen by the 1 D scanner as it increases in length.

Figure 5:
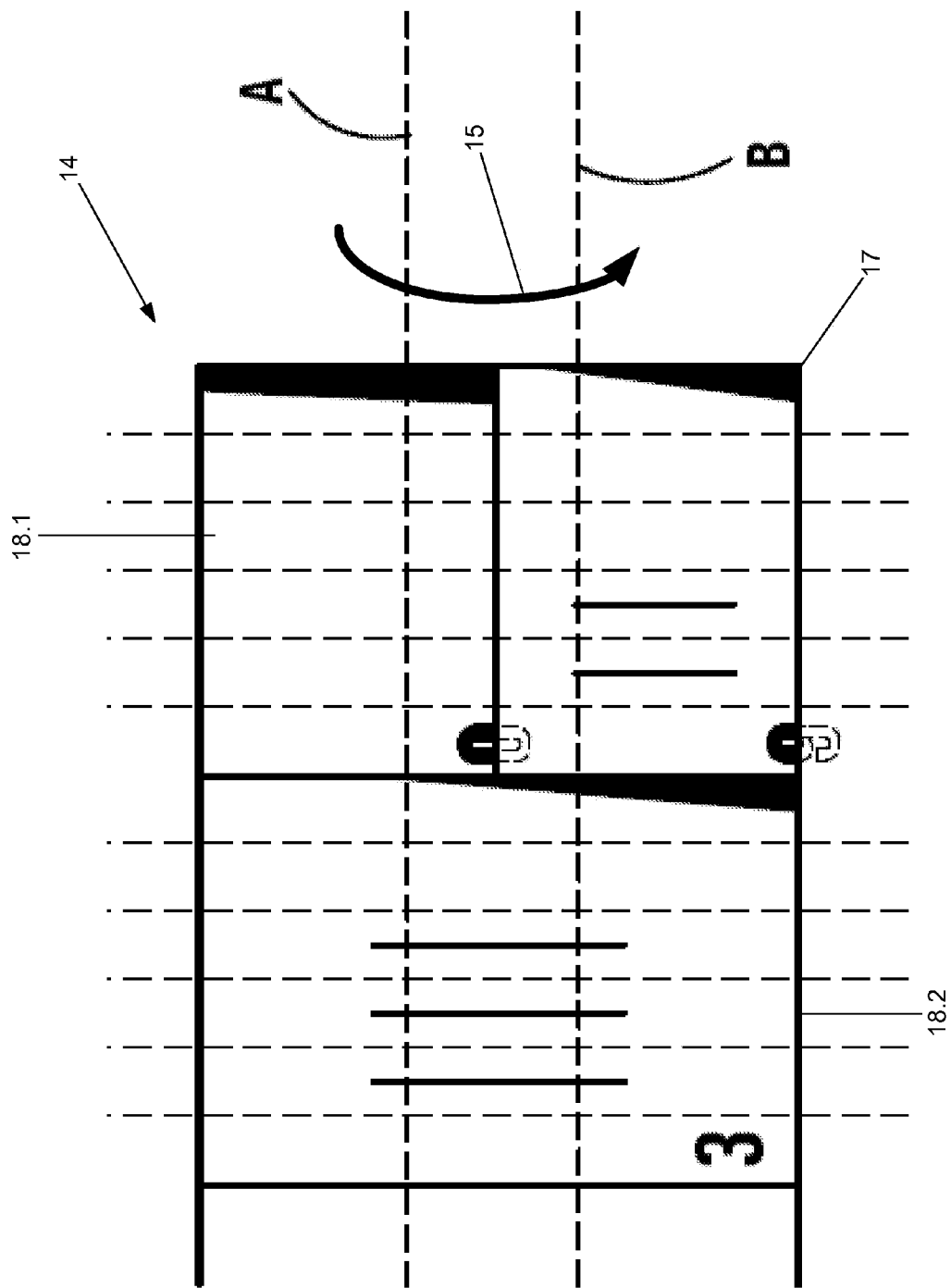
FIG. 5 shows a portion of the variable display of a meter similar to that illustrated in FIG. 2.

The CMRC 17 may be a similar format to the MRC 20, albeit provided on different locations of the display zones 16. In one example embodiment, as illustrated in FIG. 5, the CMRC is provided as a right angled triangular code in the display zone adjacent the MRC 20 (discussed below). The CMRC 17 may only be provided on certain wheels 18 (lesser significant wheels 18) or on all wheels 18.

The meter 12 may be a plug-in unit already provided with the codes 20 adapted to retrospectively fit an existing water meter system. Instead, or in addition, merely the variable display or wheels may be replaceable with a variable display 14 or wheels 18 comprising the MRCs 20. It will be noted that in certain example embodiments, the MRCs 20 may be retrospectively fitted substantially over the digits provided on the display zones 16, for example, by adhering the same thereto by glue, or other adhesive means. In certain example embodiments the display elements may be a planar sheet rotatable via axles. However, it will be appreciated that the display elements may take on various forms which will not detract from the present invention.

The reader system 10 may comprise a plurality of elements which may be provided in a single durable/weatherproof housing attachable to the meter 12. Although not illustrated, it will be appreciated that this need not be the case as certain elements of the reader system 10 may be spaced apart and may be communicably coupled to each other, either in a hardwired fashion or wirelessly. In certain example embodiments, all or some of the elements of the reader system 10 may be housed in handheld housing such that the reader system 10 is a handheld device or apparatus.

The housing may be constructed with mechanical apertures to preclude the entry of contaminants, dusts, insects, water from the surface of the display, light source and photosensing device and any optical components that are part of the system 10 that may obscure/block/deviate the light from display surface to photosensor. The housing is also constructed and has apertures that it allows mechanical alignment if necessary of the photo sensor with the display surface so that any particular segment is correctly matched with corresponding photosensor array elements and any optical elements that may be part of the system. The housing may have mechanical apertures or suitably placed seals that reveal if the system 10 has been tampered with.

In any event, the reader system 10 comprises an optical reader device 30 configured to read MRCs 20 displayed by at least one, all or a majority of the display wheels 18. The optical reader device 30 may comprise at least one photosensor to receive light reflections and a light source which may be displaceable relative to the display 14 to read the MRC 20. It will be noted that the MRC 20 is typically scanned from left to right (in the direction of arrow 21 in FIG. 3) with the photosensor receiving light emitted by the light source and reflected off the MRC 20. A voltage is generated for each bar of the MRC 20 depending on the intensity of the reflected light. The analogue voltage is then converted to digital signal via a microcontroller or processor (described in greater detail below) for further processing.

In certain example embodiments, elements for refraction of light may be provided with the device 30 or adjacent the wheels 18 thereby to better obtain reading data. Optical elements such as lenses, microlenses, prisms, polarizing elements and the like may be used to optically control/modify light properties to efficiently steer light from the light source onto display surface and then to be reflected onto optical sensor array elements. Diffractive optical elements may also be used for wavelength discrimination if color bar codes are utilized. Fiber optic based elements may be used to maximize reading efficiency. Fiber optic cables and fiber optic light bundles may be used for light delivery from the source to the display surface, if the light source is positioned a distance away from the optical reader and/or display surface.

In other example embodiments, the device 30 comprises a linear photosensor array which comprises one or more photosensors configured to be positioned transverse, preferably substantially perpendicular, to the variable display 14. The device 30 may be a one-dimensional optical reader, for example, a 1-D infrared scanner or an optical camera, or the like configured to read the MRCs 20 off the display 14. The device 30 may read codes along axis A or B, or both (or more) for more accuracy. In other example embodiment, the device may read codes along bands, for example, between A and B. The device 30 may be a two dimensional photosensor array.

The optical bar code reader may be a conventional linear optical array consisting of a linear array of photodiodes (PDA), or a linear array of CCD (charge coupled device) photosensors, the number of photodiodes/photosensors dependent on the reading resolution necessary which is further dependent on the spacing of the bar codes, the number of segments, the physical dimensions of the segments and counter, and other parameters. In cases where ambient light is not sufficient, suitable light source such a linear array of LEDS may be used. The light source is positioned and aligned relative to the actual reader and display surface for efficient reading of the display codes as will be described below.

The system 10 also comprises a processor 32. The processor 32, and the system 10 for that matter, comprises a plurality of components or modules which correspond to the functional tasks to be performed by the processor 32. In this regard, "module" in the context of the specification will be understood to include an identifiable portion of code, computational or executable instructions, data, or computational object to achieve a particular function, operation, processing, or procedure. It follows that a module need not be implemented in software; a module may be implemented in software, hardware, or a combination of software and hardware. Further, the modules need not necessarily be consolidated into one device but may be spread across a plurality of devices.

The system 10 and/or processor 32 may include a memory means 34, or machine-readable medium, e.g. memory in the processor 32, main memory, and/or hard disk drive, which carries a set of instructions, for example, embedded software to direct the operation of the processor 32. It is to be understood that the processor 32 may be one or more microprocessors, controllers, or any other suitable computing device, resource, hardware, software, or embedded logic.

In particular, the processor 32 comprises a receiver module 36 configured to receive, from the optical reader device 30, reading data comprising at least electrical signals, or information associated therewith, associated with the MRCs 20 read by the optical reader device 30. The reading data received may comprise analogue voltage data which may be converted by the receiver module 36 (ADC associated therewith) to a digital value for further processing as alluded to above.

The system 10 further comprises a reading determining module 38 configured to process the received reading data to determine a reading or character string displayed by, or associated with, the MRCs 20 displayed by the variable display 14. In this way, the wheels 18 of the meter 12 still rotate to display accumulated use of water in a conventional fashion. However, with the invention as herein described, data indicative of the accumulated use may be electronically captured for further processing.

The module 38 is typically configured to determine, from the reading data received, each character associated with the MRC 20 displayed by each display wheel 18. MRCs 20 of all the wheels 18 may be processed by the module 38. However, in other example embodiments, MRCs 20 of only a majority of wheels 16 are processed, for example, all but the least significant wheel/s 18.1 (and 18.2 in certain example embodiments). In yet a further, less sophisticated, example embodiment, the MRC 20 of just the least significant wheel 18.1 is processed by the module 38 as will be briefly described below.

The module 38 may be configured to decode the MRC 20 from the reading data in accordance with a particular decoding algorithm or mapping (e.g., the mapping of FIG. 4) to obtain the corresponding digit. In certain example embodiments, the module 38 is configured to use the reading data, or decoded reading data, as inputs to a look-up table comprising the corresponding digits or characters, thereby to obtain the latter therefrom.

Once the module 38 determines the digits or characters corresponding to the MRCs 20 in question, the module 38 is further configured to determine a reading or character string associated with the MRCs 20 by concatenating the determined characters in an order corresponding to positions of the corresponding variable display wheels 18 one the variable display, in front view. To this end, reading data received by the module 38 may comprise information to associate a particular MRC 20 with its respective wheel 18, and hence the position thereof. In other example embodiments, the module 38 has a priori information of the positions of the wheels 18 and may concatenate the determined digits based on a priori information.

The determined reading may optionally be stored in the memory 34, for example, along with a timestamp, for further processing, or trending.

A reader system 10 comprises an automatic or manually actuable output means. The output means comprises a communication module 40 configured to transmit the determined reading or character string to a remote location. The module 40 may comprise a hardwired circuit to transmit data, a wireless GSM (Global System for Mobile Communications) module or modem to transmit data from the system 10 via a communication network (pack or circuit switched as the case may be. The output means also comprises an electronic display means 42, comprising one or more of an LCD (Liquid Crystal Display), LED (Light Emitting Diode), CRT (Cathode Ray Tube), configured to display the determining reading or character string. The output means optionally also comprises an audio output means 44 (e.g., speakers) to audibly output the determining reading or character string, e.g., for the benefit of visually impaired users.

The system 10 is also capable of displaying, on a local LCD/LED display unit important commodity parameters such as previous readings, flowrate for water meters, peak usage, alarms indicia if water is above the average use in a local area, system error, etc.

In certain locations that are affected by weather extremes, it may be necessary to add a temperature control system with a temperature sensor/s and heating/cooling elements to maintain hardware within operating temperature range for the system 10.

It will be appreciated that the reader system 10 is operable in one or more of a continuous mode or a manual mode. In the continuous mode, the reader system 10 is configured continuously to operate to determine the reading, or character string, and optionally to operate the output means automatically, for example, to transmit the reading via the module 40 at periodic intervals or constantly in a streaming fashion. The system 10 may also be prompted, through its communication module 40, by a remote signal via a wired/wireless/satellite network/s from a remotely located transmitter to transmit the reading back to the requesting station or to remote location/s as specified in the prompting request. Similarly, the module 42 may be configured to continuously display the determined reading.

In manual mode, the system 10 is only operated to obtain an electronic reading when actuated to do so, for example, via a push-button, switch. The system 10 may also actuated when prompted, through its communication module 40, by a remote signal via a wired/wireless/satellite network/s from a remotely located transmitter. The remote request may also prompt the system to transmit the reading back to the requesting station or to remote location/s as specified in the prompting request. It will be appreciated that on manual actuations, the output means may optionally be simultaneously operated. The manual mode may be the preferred mode of operation of the system 10 as it lowers power consumption of the system 10. This becomes especially significant when the system 10 is powered by portable power cells or batteries as it extends battery life.

One method of continuous mode operation is to use a counter with several wheels as in FIG. 3 except that the least significant wheel (LSW) displays segments are altered in an alternating manner with 2 different codes. For example if we use black and white colors as codes, the display segment with "0" is painted white, "1" is painted black, "2" is painted white etc until digit "9". Typically in a water or electric meter the LSW turns when water or current flows through with the adjacent counter wheels static. When it makes a complete rotation of 10 units, going from "0" to "9" it turns its adjacent wheel by one unit.

To convert these binary codes to number, a reader is developed as follows: A suitable light source, such as a suitably bright LED, is positioned to emit light onto the segments of the LSW and photosensor is positioned to receive reflected light off the LSW segment. As the wheel rotates, and on transition from a black to a white segment, the counter increases by one unit. This transition is detected by the photosensor whose output is connected to an operational amplifier, necessary circuitry and a microcontroller which stores the information in memory and increments to calculate a final reading. The stored reading can be then stored in external memory for extraction to a remote location via a transmitter or displayed on a local LED/LCD display device or shunted to a flash memory module that can be accessed via a USB memory stick etc. In some instance depending on the quality of the stability of the light source, photosensor, hardware components, there may be an error variance in the readings for any particular segment. A solution to this variance is to average subsequent readings for a particular segment, as any particular segment will yield more than reading depending how fast the wheel turns.

One should note that in this continuous system only the least significant wheel is altered and that the counter still retains the commodity value to be measured in human readable digits, albeit with a lesser accuracy since the LSW is altered. This is advantageous in that the humanly readable information is still available in cases where the electrical system may fail or to check if system is malfunctioning.

Another mode of operation is a manual mode. An example of manual mode of operation would be as follows. Display segments of a typical counter (FIG. 3) are substituted with bar codes as in FIG. 4. This mode is described in further detail in the preferred embodiment. At any instant of time the commodity to be read is "stored" on the many display segments on bar code form. A bar code reader reads all the codes and stores them in a local microcontroller/memory module for local display or to be transferred to a flash memory stick or for output to a remote location via a transmission module. In manual mode, this is the only time there is a drain on electrical energy—that is whenever the meter needs to be read. This is an advantage over the continuous system in that it does not have to continuously electronically emit light and read and then to "calculate", store the commodity to be measured draining on the electrical resource and limiting the lifetime of components. In this manual mode, inherent in the operation is the generation ("calculation") via mechanical means of measured commodity. This presents a great savings on electrical energy.

It also makes it possible to operate in battery mode if so desired. One has to consider the particular application, calculate overall the electrical energy cost to ensure that it is low enough to warrant the use of battery, lifetime, replacement etc. In practical terms a good example for use of battery technology would be a water meter in an agricultural site where it is difficult to implement electrical power connections from a mains supply. So a water meter with battery operation would be preferred. If the meter is read monthly as it typical of most situations, the electrical system only turns on once a month to electronically read the commodity and drains the battery only once vs. a continuously system where if a battery is used it would be drained almost continuously.

In situations where it is desired, electrical energy savings can also be realized by electromechanical means. For example in a continuous mode operation, in a water meter, a mechanical aperture presses on a mechanical switch due to additional pressure when water flows, the switch activating the system which goes in to optical reading mode and turns off when the pressure decreases when water ceases to flow.

Generally electrical energy savings can be realized by also putting the microcontroller into sleep mode and using interrupt routines when the system needs to awoken and read. For example if the municipality wants to read a particular water meter, it sends out a signal from the central location to the local house meter which realizes the interrupt and becomes operable.

Further electrical savings may be realized by systems that are programmed to transmit only after a period. For example a water meter transmits data monthly. Thus the system may only contain a transmitter module such as a simple wireless modem that is turned on at a set time by a microcontroller or other means and precludes the need for a receiver module at the site of the meter whose use may drain on electrical power.

Similarly if a receiver module is used it may be turned "on" by a microcontroller or electromechanical means in concert with an external stimulus, for example software at the central municipality maybe instructed to only access the meter on certain dates, this is synchronized with the programming of the microcontroller or other electrical/electromechanical means to turn the receiver on.

Additional electrical savings, especially in warmer climates can realized with solar cell that can be used to power elements of the system, the entire system or supplement battery usage where battery is a power source or recharge an existing battery.

The processor 32 also conveniently comprises a checking receiver module configured to receive checking data from the optical reader device 30, the checking data comprising at least an electrical signal, or information associated therewith, associated with at least one CMRC 17 read by the device 30.

The processor 32 also advantageously comprises a transition determining module 48 to determine the transition of lesser significant wheels 18, for example 18.1 with reference to FIG. 5, and the impact thereof on at least immediate more significant wheels (e.g., wheel 18.2 in FIG. 5).

The module 48 is configured to determine if a lesser significant display wheel 18.1 is in transition to display a subsequent display zone. This may be done in a plurality of different ways, for example, determining the checking data is outside a threshold for an accurate reading. This could also be done by analysing the checking data along A and B to determine the thickness of the CMRC 17. The thicker CMRC 17 indicates that the number corresponding to that particular display zone is to be selected for the reading. The thickness of the CMRC 17 results in a variation of the checking data as the electrical signals or voltage read by the device 30 is associated with the reflections received from the display zone 16. The determination could also be done by determining from the reading data that the wheel 18.1 is not providing a reliable MRC 20.

The module 48 is also configured to determine if the transition of wheel 18.1 will result in the transition of an adjacent more significant wheel 18.2. This usually occurs when the module 48 determines that the wheel 18.1 is moving from a position when the MRC 20 corresponding to the digit "9" is transitioning (e.g., in the direction of arrow 15 in FIG. 5) to display the MRC 20 corresponding to the digit "0". Once this determination is made, the module 48 is configured to operate the reading determining module 38 to increment the numeric value determined from the MRC 20 displayed by the more significant wheel 18.2 or assign the next numeric value to be displayed by the more significant wheel thereto 18.2. In the illustrated example of FIG. 5, this will result in the transition from digit "3" to digit "4". This may be done for just the last two wheels 18.1 and 18.2 or may be done for all the wheels 18, in which case one the module 48 operates, it treats wheel 18.2 as the lesser significant wheel and the wheel shouldering wheel 18.2 as the more significant wheel as operates accordingly.

A problem associated with manual meters digit faces is that they become mechanically jammed with debris. In this regard, the operation of the module 48 may be used to indicate rotary face position, in combination with electronic diagnosis to determine if a digit has correctly rotated. For example if an adjacent digit should be rotated incrementally, after the less significant digit has made a complete round, one can check the level of rotation of the adjacent or jammed digit. This error check is in addition to a first simple error check electronically to ensure that a digit should be incremented after the less significant adjacent digit has been made a complete round.

Optionally, if the module 48 determines that any wheel is transitioning, the module 48 is configured to operate the module 38 to increment the numeric value determined from the MRC 20 displayed, or more likely part displayed, displayed by the respective wheel 18. For example, if the module 48 determines that the wheel 18 is in transition from the MRC 20 corresponding to "3" to the MRC 20 corresponding to "4" and the module 38 reads the MRC 20 displayed for the display wheel as 3, the module 48 operates the module 38 to allocate the next numeral or digit ("4") to the respective wheel 18.

It will be noted that in certain less sophisticated example embodiments, the least significant wheel 18.1 may be provided with at least one display zone 16 blacked out or darkened and the rest coloured white. The MRC 20 is therefore a two state reflective surface, with the blacked out zone reflecting significantly less light than the white zone. In this example embodiment, an initial reading of the meter 12 is stored by the system 10. A counter is then implemented, either set from the initial reading or added to the initial reading, which counter is incremented at each rotation of the black or darker (or lighter for wheels 18 with predominantly dark display zones 16) zone 16 as determined by the module 38 thereby obtaining the reading in accordance with the present invention.

In one example embodiment, it will be understood that the system 10 may comprise a user interface, e.g. input buttons, switches or a touchscreen interface to enable a user to interact with the system 10 and operate or control operation of the same.

In another example embodiment, the system 10 has a security layer that may consist of means for encrypting output transmission signals, a PIN system for personal interrogation of internal data and a security layer for external prompting signals which confirms the legitimacy of an external request.

Figure 6:
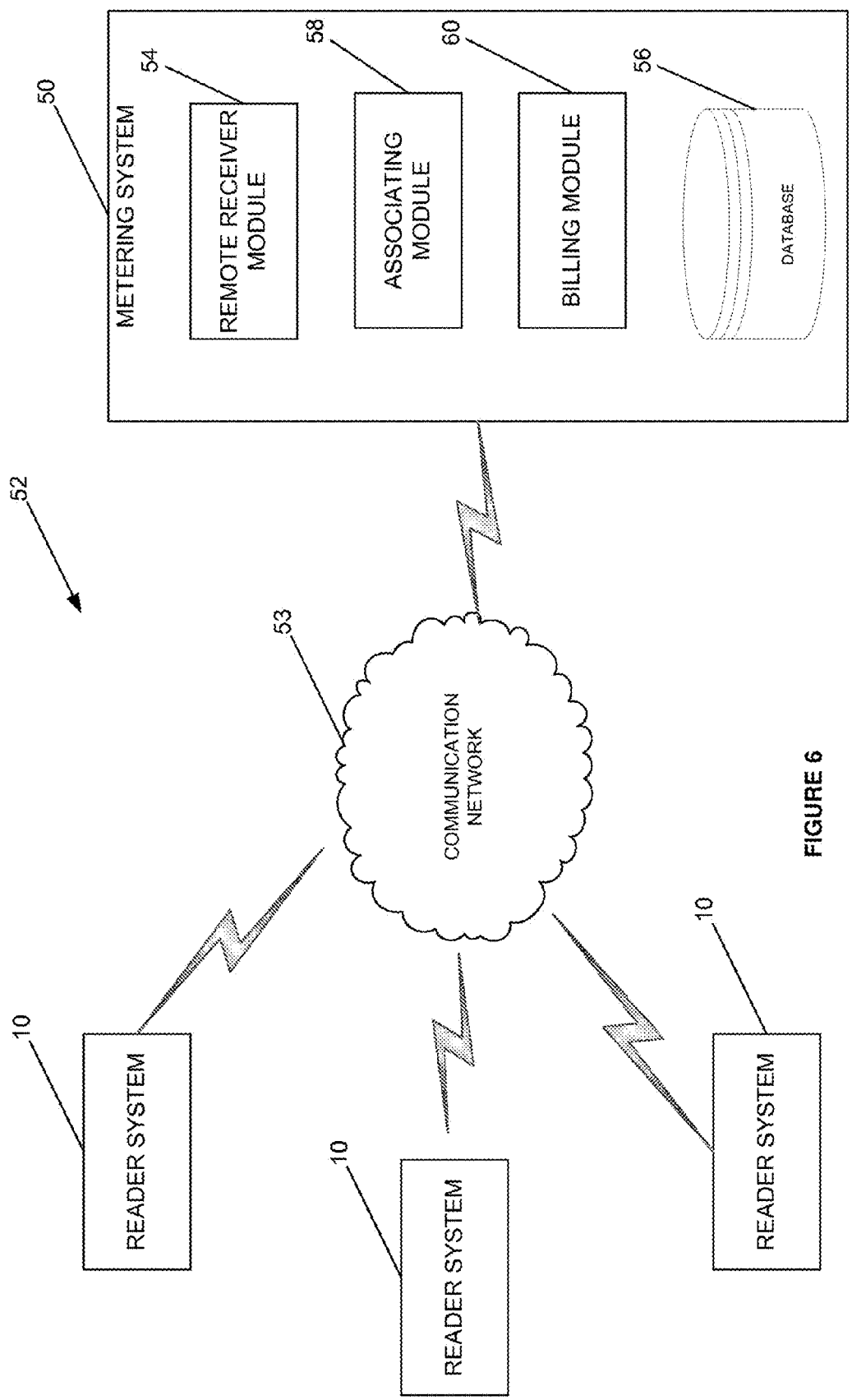
FIG. 6 shows a schematic block diagram of a metering system in accordance with an example embodiment of the invention.

Referring now to FIG. 6 of the drawings where a network incorporating a metering system 50 in accordance with an example embodiment is generally indicated by reference numeral 52.

The system 50 comprises a remote receiver module 54 configured to receive, periodically or on an ad hoc basis, determined readings or character strings from a plurality of reader systems 10 as hereinbefore described disposed relative to meters 12 for measuring usage of a commodity such as water. The system 50 may be typically provided at a municipality or a municipal/utilities service provider. The module 54 is configured to receive the data from the systems 10 in a wired fashion or wirelessly over the communication network 53, or both depending on the implementation. The communication network 53 may be a cellular telecommunication network, may be a packet-switched network and may form part of the Internet. Instead, the communications network 53 may be a circuit switched network, public switched data network, or the like.

As herein described, the module 54 may be configured to send a prompting or interrogation signal or message to the system 10 or meter 12 to receive determined readings therefrom. The prompting message may optionally wake the system 10 or meter 12 to determine the reading and transmit the same either wirelessly or via a hard wired connection to the system 50.

The system 50 also comprises a database 56 configured to store at least the received readings or character one strings; and an associating module 58 configured to associate, in the database 56, received readings or character strings with the respective meters 12.

The systems 10 and/or meters 12 may form part of the system 50.

In any event, the system 50 comprises a billing module 60 configured to use the reading data associated with a particular meter 12 or associated reader system 10 in accordance with at least one tariff structure thereby to determine a cost for usage of the metered commodity, e.g. water.

In situations where there are number of commodity meters 12 (with associated systems 10) in relatively close proximity it is necessary to transmit readings from a proximal location to a remote station/system 50, for example, at a municipality. This is achieved by interconnecting meters 12 that are within a proximal distance through LANS (local area network/s), for example hardwire electrical interconnection, short range wireless system or a fiber optic/electrical wireline network. The central location/s then transmits the data via a larger area long range network to a final destination via wireless, wireline or satellite. A common example would be a house with an electrical meter and a water meter. The meter readings are fed to a central point at the house and then sent via one GSM transmission to a municipality avoiding two separate transmissions. The data is then separated at the municipality interdepartmentally by software means. A second transmission is sent via cellular network, via SMS to the houseowners cellphone and/or to a home computer via wireline/wireless/satellite networks or a home LAN connection.

A more complex example would be a chemical plant with several stations of water meters and electrical meters. The meter data is electively forwarded by hardware or software means to various departments in the plant, any particular department only receiving meter data pertainable to its need and electable by software options from the department computers that control the direction of meter readings from the various meters throughout the plant. Similarly one could envisage branch offices receiving data from any of the meters or departments and then a central office receiving all meter readings.

The main advantage of such a system is the savings in terms of time, gain in productivity and the ease of troubleshooting any particular meter, department or zone in a company or municipality.

Example embodiments will now be further described in use with reference to FIGS. 7 to 10. The example methods shown in FIGS. 7 to 10 are described with reference to FIGS. 1, and 3 to 6, although it is to be appreciated that the example methods may be applicable to other systems (not illustrated) as well.

Figure 7:
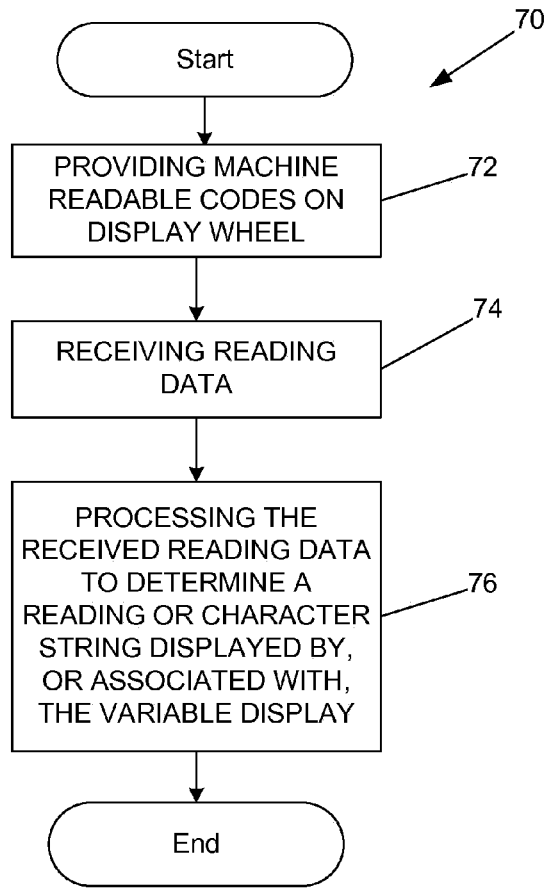
FIG. 7 shows a high level flow diagram of a method for reading a meter in accordance with an example embodiment.

Referring first to FIG. 7 of the drawings, where a high flow diagram of a method for electronically reading a variable display 14 comprising one or more mechanically variable display elements 18 variably displaying one or more MRCs 20, in accordance with an example embodiment, is generally indicated by reference numeral 70.

The variable display 14 may be associated with the meter 12 as hereinbefore described.

The method 70 comprises providing, at block 72, MRCs 20 and CMRCs 17 at each display zone 16 on a display surface of each indicator wheel 18 of the meter 12, wherein the MRCs 20 and CMRCs 17 is selected from one or more of a bar code, a machine readable colour coding, a Quick Response (QR) code, a geometric shape code, a dark or black display zone, a light or white display zone and a pattern thickness code readable by a machine. It will be appreciated that in certain example embodiments, the step 72 may be carried out for one or a few display zones 16 of one or a few wheels 18. It will further be appreciated that the step 72 may be omitted in certain cases, for example, when meters 12 are manufactured with the MRCs 20 and CMRCs 17 provided thereon.

The method 70 comprises receiving, at block 74 by way of module 38, reading data from the optical reader device 30, the reading data being associated with at least one MRC 20 read by the optical reader device 30. As previously discussed, the device 30 may scan from left to right in the direction of arrow 21 or it may be stationary relative to the display 14 in order to read the same. The device 30 may be operated to illuminate the display 14 and receive reflected light therefrom, the reflected light being receivable by the device 30, or photoreceptors/photosensors associated therewith. The light received may be converted to an analogue voltage proportional to the received reflected light. It will be appreciated that the received analogue voltage may form part of the reading data.

In any event, the method 70 comprises processing, at block 76 by way of the module 38, the received reading data to determine a reading or character string associated displayed by, or associated with, the variable display 14. It will be understood that the reading obtained typically corresponds to the digits associated with the MRCs 20 displayed by the variable display 14 at the time of operation of the system 10, which in turn care correspond to the digits which would have been displayed by a conventional meter. The meter 12 typically also provides the corresponding digits at a corner of the display zone 16 for human reading.

Figure 8:
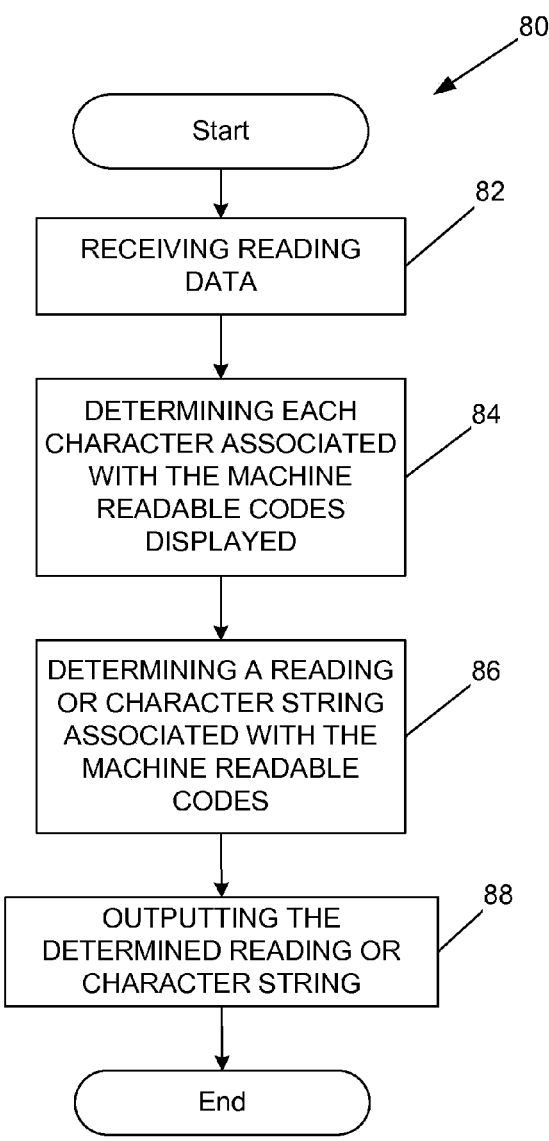
FIG. 8 shows a lower level flow diagram of a method for reading a meter in accordance with an example embodiment.

Referring now to FIG. 8 of the drawings where a flow diagram of another method is generally indicated by reference numeral 80.

The method 80 comprises receiving, at block 82, reading data associated with MRCs 20 displayed by all or a majority of display wheels 18 of the variable display 14. This step is similar to the step 72 as described above. However, it involves receiving MRCs 20 associated with more than one wheel 18.

The method 80 then comprises determining, at block 84, from the reading data received, each character or digit associated with the MRC 20 displayed by each display wheel 18 by way of the module 38.

The method 80 then comprises determining, at block 86, a reading or character string associated with the MRCs 20 displayed by combining or concatenating the determined characters in an order corresponding to positions of the corresponding display wheels 18 on the variable display 14.

The method 80 then comprises outputting, at block 88, the determined reading or character string by one or more of transmitting the same to a remote location by way of module 40, operating the electronic display means 42 to display the same electronically and operating the audio output means 44 to audibly output the determined reading.

The method 80 (not shown) may comprise the step of decoding the reading data in accordance with a decoding scheme or algorithm in order to determine the character/s associated with the reading data as described above.

Figure 9:
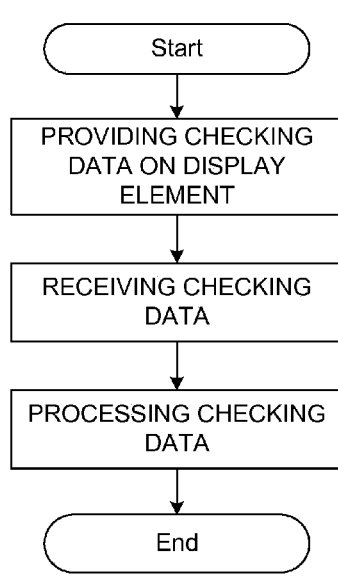
FIG. 9 shows a high level flow diagram of a method for reading a meter in accordance with an example embodiment.

Turning now to FIG. 9 where a flow diagram of another method in accordance with an example embodiment is generally indicated by reference numeral 90.

The method 90 comprises providing, at block 92, CMRC 17 at least a portion of at least one display zone 16 of one or more display wheels 18 in a similar manner as described above with reference to FIG. 7 and step 72 of the method 70.

The method 90 then comprises receiving, at block 94 via module 46, checking data from the optical reader device 30 in a manner as previously described The method 90 lastly comprises the step of processing, at block 96 by way of module 48, the received checking data to account for wheels 18 which are in transition.

Figure 10:
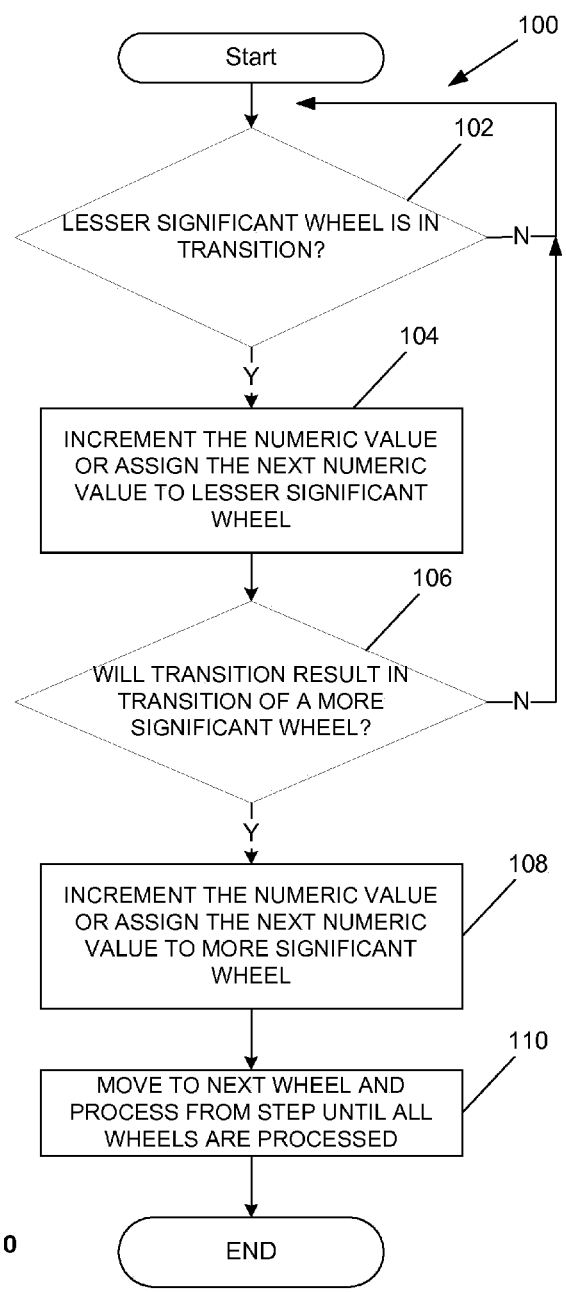
FIG. 10 shows a lower level flow diagram of a method for reading a meter in accordance with an example embodiment.

Turning now to FIG. 10 of the drawings where a flow diagram of a method in accordance with an example embodiment is generally indicated by reference numeral 100. The method 100 is substantially a more detailed description of the method step 96 as described above which is carried out by the module 48, for example.

The method 100 determines, at block 102, if a lesser significant display wheel 18.1 is in transition to display a subsequent display zone.

If it is determined that the lesser significant display wheel 18.1 is in transition to display a subsequent display zone, the method 100 comprises assigning, at block 104 the next digit or numeric value to the wheel 18.1 and then determining, at block 106, if the transition will result in a transition of an adjacent more significant wheel 18.2.

If it is determined that the transition will result in the transition of the adjacent more significant wheel 18.2, the method 100 comprises incrementing or assigning, at block 108 the numeric value determined from the MRC 20 displayed by the more significant wheel 18.2.

The method 100 then comprises the step of repeating, at block 110, the processing steps 102 to 108 for all the display wheels of the variable display. It will be appreciated that the for the most significant wheel 18, the wheel 18 on the extreme left of the display, there will be no more significant wheel to perform the processing steps discussed here with.

A problem associated with manual meters digit faces is that they become mechanically jammed with debris.

The same method described with CMRCs 17 may be used to indicate rotary face position, in combination with electronic diagnosis to determine if a digit has correctly rotated. For example if an adjacent digit should be rotated incrementally, after the less significant digit has made a complete round, one can check the level of rotation of the adjacent or jammed digit. This error check is in addition to a first simple error check electronically to ensure that a digit should be incremented after the less significant adjacent digit has been made a complete round.

Though not described in detail, it will be appreciates that the invention extends to a method of retrospectively fitting a meter with at least one machine readable code on at least one display zone of at least one wheel. The method may comprise replacing all the wheels with wheels comprising MRCs 20 as described herein.

The invention as described herein is typically provided to facilitate electronic reading of the variable display with relative ease, which reading would otherwise have been done physically by a human operator or electronically by a more complicated or expensive means. The invention avoids the next for costly replacement of conventional mechanical meters as the invention may be retrospectively attachable to an existing meter to obtain electronic or electrical data therefrom for further processing.

The invention claimed is:

1. A method for electronically reading a variable display comprising mechanically variable display elements variably providing or displaying machine readable codes, the method comprising:

receiving reading data from a reader device, the reading data comprising an electrical signal, or information associated therewith, associated with machine readable codes read by the reader device, wherein the machine readable codes are provided or displayed by all or a majority of display elements of the variable display, and wherein the machine readable codes are non-alphanumeric machine readable codes which correspond to numeric or alphanumeric values or characters either associated with the display elements, or displayed by the display elements in addition to the machine readable codes; and processing the received reading data to determine each character associated with the machine readable code provided or displayed by each display element, and concatenating the determined characters in an order corresponding to positions of the corresponding variable display elements on the variable display thereby to determine a reading or character string displayed by, or associated with, the variable display, and determining a value associated with the concatenated determined characters.

2. A method as claimed claim 1, the method comprising outputting the determined reading or character string by one or more of transmitting the same to a remote location and operating an electronic display means to display the same electronically.

3. A method as claimed in claim 1, the method comprising decoding the reading data in accordance with a decoding scheme or algorithm in order to determine the character/s associated with the reading data.

4. A method as claimed in claim 1, wherein the variable display is associated with a meter such that the display elements comprises display wheels which rotatably display the machine readable codes corresponding to numeric or alphanumeric values or characters associated therewith.

5. A method as claimed in claim 4, the method comprising:

providing a machine readable code at each display zone on a display surface of each indicator wheel, wherein the machine readable code is selected from one or more of a bar code, a machine readable colour coding, a Quick Response (QR) code, a geometric shape code, a dark or black display zone, a light or white display zone and a pattern thickness code readable by a machine; and optionally providing a corresponding character indicia or numeral on each display zone, adjacent the machine readable code.

6. A method as claimed in claim 4, the method comprising:

providing a checking machine readable code on at least a portion of at least one display zone of one or more display wheels, wherein the checking machine readable code is selected from one or more of a bar code, a machine readable colour coding, a Quick Response (QR) code, a geometric shape code, a dark or black display zone, a light or white display zone and a pattern thickness code readable by a machine;

receiving checking data from the reader device, the checking data comprising at least an electrical signal, or information associated therewith, associated with at least one checking machine readable code read by the reader device; and processing the received checking data to:
determine if a lesser significant display wheel is in transition to display a subsequent display zone;
if it is determined that the lesser significant display wheel is in transition to display a subsequent display zone, determining if the transition will result in a transition of an adjacent more significant wheel;
if it is determined that the transition will result in the transition of the adjacent more significant wheel, incrementing the numeric value determined from the machine readable code displayed by the more significant wheel or assigning the next numeric value to be displayed by the more significant wheel thereto; and
optionally repeating the processing steps for all, where applicable, the display wheels of the variable display.

7. A method as claimed in claim 6, wherein if it is determined that the lesser significant display wheel is in transition to display a subsequent display zone, the method comprising incrementing the numeric value determined from the machine readable code displayed by the lesser significant wheel or assigning the next numeric value to be displayed by the lesser significant wheel thereto.

8. A method as claimed in claim 7, the method comprising:
determining an initial numeric value reading of the meter;
implementing a counter to obtain a counter value;
receiving reading data associated with the machine readable code provided on at least one display zone of the last or least significant display wheel, at each rotation of the display wheel;
incrementing the counter, and hence the counter value, for each instance of the reading data being obtained from the at the display zone; and
determining a current reading of the meter by determining a current counter value.

9. A reader system for electronically reading a variable display comprising one or more mechanically variable display elements variably providing or displaying machine readable codes, the reader system comprising:
reader device configured to read machine readable codes provided or displayed by all or a majority of display elements of the variable display; and
a processor communicably coupled to the reader device, the processor comprising:
a receiver module configured to receive, from the reader device, reading data comprising at least electrical signals, or information associated therewith, associated with the machine readable codes read by the reader device, wherein the machine readable codes are non-alphanumeric machine readable codes which correspond to numeric or alphanumeric values or characters either associated with the display elements, or displayed by the display elements in addition to the machine readable codes; and
a reading determining module configured to process the received reading data to determine each value or character associated with the machine readable code provided or displayed by each display element, and concatenate the determined characters in an order corresponding to positions of the corresponding variable display elements on the variable display thereby to determine a reading or character string displayed by, or associated with, the variable display.

10. A reader system claimed in claim 9, the reader system comprising an automatically or manually actuable output means comprising one or more of a communication module configured to transmit the determined reading or character string to a remote location, electronic display means configured to display the determining reading or character string same electronically and audio output means to audibly output the determining reading or character string.

11. A reader system claimed in claim 9, wherein the variable display is associated with a meter such that the display elements comprise display wheels which rotatably display the machine readable codes corresponding to numeric or alphanumeric values or characters.

12. A reader system claimed in claim 11, wherein the reader system, or at least components thereof, is provided in a housing which is configured to be handheld or housed in a housing which comprises attachment means for operative attachment to the meter such that the reader device is positioned substantially transverse to the variable display of the meter.

13. A reader system claimed in claim 11, wherein the processor further comprises:
a checking receiver module configured to receive checking data from the reader device, the checking data comprising at least an electrical signal, or information associated therewith, associated with at least one checking machine readable code read by the reader device from a display zone displayed by at least one display wheel; and
a transition determining module configured to perform the following processing steps:
determining if a lesser significant display wheel is in transition to display a subsequent display zone;
if it is determined that the lesser significant display wheel is in transition to display a subsequent display zone, determining if the transition will result in a transition of an adjacent more significant wheel;
if it is determined that the transition will result in the transition of the adjacent more significant wheel, operating the reading determining module to increment the numeric value determined from the machine readable code displayed by the more significant wheel or assign the next numeric value to be displayed by the more significant wheel thereto; and
optionally repeating the processing steps for all, where applicable, the display wheels of the variable display.

14. A reader system claimed in claim 10, wherein the reader system is operable in one or more of a continuous mode or a manual mode, wherein in the continuous mode the reader system is configured continuously to operate to determine the reading, or character string, and optionally to operate the output means automatically, and wherein in the manual mode the reader system is configured to operate when prompted to determine the reading, or character string.

15. A system as claimed in claim 9, the system comprising a meter having the variable display comprising display elements in the form of display wheels which rotatably provide or display machine readable codes corresponding to numeric or alphanumeric values or characters associated with the display elements; and wherein the reader device is an optical reader device positioned relative to the variable display so as to read the machine readable codes.

16. A system as claimed in claim 15, the system comprising:
- a remote receiver module configured to receive, periodically or on an ad hoc basis, determined readings or character strings associated with the meter, wherein the meter is for measuring usage of a commodity;
- a database configured to store at least the received readings or character strings; and
- an associating module configured to associate, in the database, received readings or character strings with the respective meters.

17. A system as claimed in claim 16, the system comprising a billing module configured to use the determined reading or character string associated with the meter in accordance with at least one tariff structure thereby to determine a cost for usage of the metered commodity.

18. A method for electronically reading a variable display comprising mechanically variable display elements variably providing or displaying machine readable codes, the method comprising:
- receiving reading data from a reader device, the reading data comprising an electrical signal, or information associated therewith, associated with machine readable codes read by the reader device, wherein the machine readable codes are provided or displayed by all or a majority of display elements of the variable display, and wherein the machine readable codes are non-alphanumeric machine readable codes which correspond to numeric or alphanumeric values or characters either associated with the display elements, or displayed by the display elements in addition to the machine readable codes and the variable display is associated with a meter such that the display elements comprises display wheels which rotatably display the machine readable codes corresponding to numeric or alphanumeric values or characters associated therewith;
- processing the received reading data to determine values or characters associated with the machine readable codes provided or displayed by the display elements thereby to determine a reading or character string displayed by, or associated with, the variable display;
- providing a checking machine readable code on at least a portion of at least one display zone of one or more display wheels, wherein the checking machine readable code is selected from one or more of a bar code, a machine readable colour coding, a Quick Response (QR) code, a geometric shape code, a dark or black display zone, a light or white display zone and a pattern thickness code readable by a machine;
- receiving checking data from the reader device, the checking data comprising at least an electrical signal, or information associated therewith, associated with at least one checking machine readable code read by the reader device; and
- processing the received checking data to:
  - determine if a lesser significant display wheel is in transition to display a subsequent display zone;
  - if it is determined that the lesser significant display wheel is in transition to display a subsequent display zone, determining if the transition will result in a transition of an adjacent more significant wheel;
  - if it is determined that the transition will result in the transition of the adjacent more significant wheel, incrementing the numeric value determined from the machine readable code displayed by the more significant wheel or assigning the next numeric value to be displayed by the more significant wheel thereto; and
  - optionally repeating the processing steps for all, where applicable, the display wheels of the variable display.

* * * * *